United States Patent [19]
Hurley et al.

[11] Patent Number: 5,938,878
[45] Date of Patent: Aug. 17, 1999

[54] POLYMER STRUCTURES WITH ENHANCED PROPERTIES

[75] Inventors: Robert F. Hurley, Centerville; Matthew L. Kozma, Osterville; John D. Bambara, Osterville; Scott C. Smith, Osterville, all of Mass.; Richard Bambara, Cooperstown, N.Y.

[73] Assignee: Sentinel Products Corp., Hyannis, Mass.

[21] Appl. No.: 08/699,000

[22] Filed: Aug. 16, 1996

[51] Int. Cl.⁶ .................................................. B32B 5/20
[52] U.S. Cl. ...................... 156/219; 156/209; 156/272.2; 428/316.6; 428/309.9; 428/218; 428/159; 428/36.5; 428/304.4; 36/86; 36/115; 36/116
[58] Field of Search ................................. 428/304.4, 36.5, 428/159, 218, 309.9, 316.6; 156/209, 219, 272.2; 36/86, 115, 116

[56] References Cited

U.S. PATENT DOCUMENTS

| | | |
|---|---|---|
| 383,255 | 5/1888 | Spaet et al. . |
| 430,703 | 6/1890 | Spahn et al. . |
| 544,535 | 8/1895 | Hennig . |
| 1,141,123 | 6/1915 | Knight . |
| 1,180,965 | 4/1916 | Baly . |
| 1,204,249 | 11/1916 | Condon, Jr. . |
| 1,223,707 | 4/1917 | Lyon . |
| 1,300,861 | 4/1919 | Otte . |
| 1,302,828 | 5/1919 | Miller . |
| 1,342,518 | 6/1920 | Webber . |
| 1,840,844 | 1/1932 | Krema . |
| 1,858,253 | 5/1932 | Uline . |
| 1,930,834 | 10/1933 | Berssenbrugge . |
| 2,074,981 | 3/1937 | Converse . |
| 2,145,734 | 1/1939 | Rastetter . |
| 2,159,564 | 5/1939 | McPherson . |
| 2,227,871 | 1/1941 | Wigell . |
| 2,254,203 | 9/1941 | Bender ........................................ 18/15 |
| 2,387,730 | 10/1945 | Alderson .................................... 260/94 |
| 2,425,162 | 8/1947 | Overbey . |
| 2,432,266 | 12/1947 | Wilkinson . |
| 2,450,436 | 10/1948 | McIntire ..................................... 18/48 |
| 2,515,250 | 7/1950 | McIntire ................................... 18/47.5 |
| 2,660,498 | 11/1953 | Norquist . |
| 2,740,157 | 4/1956 | McCurdy et al. .......................... 18/12 |
| 2,760,838 | 8/1956 | Greacen . |
| 2,812,012 | 11/1957 | Hansburg . |
| 2,817,567 | 12/1957 | Shepherdson . |
| 2,988,777 | 6/1961 | Bieber et al. ............................... 18/18 |
| 3,037,831 | 6/1962 | Craddock et al. . |
| 3,044,840 | 7/1962 | Hamilton . |
| 3,061,262 | 10/1962 | Nika . |
| 3,067,147 | 12/1962 | Rubens et al. ............................ 260/2.5 |
| 3,096,963 | 7/1963 | Welsh . |
| 3,098,831 | 7/1963 | Carr ......................................... 260/2.5 |
| 3,098,832 | 7/1963 | Pooley et al. ............................ 260/2.5 |
| 3,235,884 | 2/1966 | Rehsteiner . |
| 3,238,565 | 3/1966 | Jacobs ........................................ 18/19 |
| 3,287,477 | 11/1966 | Vesilind ..................................... 264/53 |
| 3,335,892 | 8/1967 | Hildreth ..................................... 215/41 |
| 3,338,864 | 8/1967 | Megall et al. ........................... 260/45.7 |
| 3,346,686 | 10/1967 | Collins ..................................... 264/321 |
| 3,379,802 | 4/1968 | Radey et al. ............................... 264/53 |
| 3,381,998 | 5/1968 | Cheshier et al. . |
| 3,396,062 | 8/1968 | White ....................................... 156/244 |
| 3,396,928 | 8/1968 | Lay . |
| 3,399,098 | 8/1968 | Omoto et al. ............................ 156/200 |
| 3,413,387 | 11/1968 | Ohsol ......................................... 264/46 |
| 3,413,388 | 11/1968 | Lux et al. ................................... 264/46 |
| 3,431,163 | 3/1969 | Gilbert ...................................... 161/161 |
| 3,431,164 | 3/1969 | Gilbert ...................................... 161/161 |
| 3,491,706 | 1/1970 | Glass . |
| 3,509,927 | 5/1970 | Hasty et al. . |
| 3,539,473 | 11/1970 | Simpson et al. .......................... 260/2.5 |
| 3,565,243 | 2/1971 | Freeman .................................... 206/46 |
| 3,574,958 | 4/1971 | Martuch ..................................... 36/2.5 |
| 3,639,304 | 2/1972 | Raley, Jr. ............................. 260/2.5 FP |
| 3,644,230 | 2/1972 | Cronin ................................. 260/2.5 E |
| 3,645,155 | 2/1972 | Robinson .................................. 83/663 |
| 3,645,992 | 2/1972 | Elston . |
| 3,646,155 | 2/1972 | Scott ........................................ 260/827 |
| 3,651,183 | 3/1972 | Hosoda et al. ............................ 264/54 |
| 3,711,584 | 1/1973 | Sagane et al. ............................. 264/54 |
| 3,743,611 | 7/1973 | Muroi et al. ........................... 260/2.5 B |
| 3,755,208 | 8/1973 | Ehrenfreund .......................... 260/2.5 E |
| 3,796,430 | 3/1974 | Sudo . |
| 3,804,684 | 4/1974 | Tokushige et al. ........................ 156/60 |

(List continued on next page.)

FOREIGN PATENT DOCUMENTS

| | | |
|---|---|---|
| 451864 | 10/1948 | Canada . |
| 0 584 927 A2 | 3/1994 | European Pat. Off. . |
| 0 702 032 A2 | 3/1996 | European Pat. Off. . |
| WO 90/03414 | 4/1990 | WIPO . |
| WO 92/14784 | 9/1992 | WIPO . |
| WO 93/03093 | 2/1993 | WIPO . |

OTHER PUBLICATIONS

Copy of International Search Report mailed Nov. 12, 1997.

Ultsch & Fritz, "Crosslinking of LLDPE and VLDPE via graft–polymerized vinyltrimethoxysilane" *Rubber Processing and Applications,* 13:81–91, 1990.

Borg, "Ethylene/Propylene Rubber" *Rubber Technology,* Van Nostrand Reinhold Company, pp. 220–248, 1973.

Mukherjee et al., "Radiation–Induced Changes in Polyolefins" Rev. Macromol. Chem. Phys., C26(3):415–436 1986.

Park, "Handbook of Polymeric Foams and Foam Technology, Polyolefin Foam," Oxford University Press, Chapter 9, pp. 156–242.

*Primary Examiner*—Ponnathapura Achutamurthy
*Assistant Examiner*—T. D. Wessendorf
*Attorney, Agent, or Firm*—Fish & Richardson P.C.

[57] ABSTRACT

Polymer structures having a laminated surface and enhanced physical properties that can be used for packaging, athletic gear (e.g., padding, water sport equipment), gaskets, and protective garments are described. The structures include a core of a relatively high density material and one or more layers laminated to the surfaces of the core material of relatively low density polymer foam. The structures can be stiff or flexible. The foam layers improve the softness of the surfaces of the core material.

9 Claims, 7 Drawing Sheets

U.S. PATENT DOCUMENTS

| | | | |
|---|---|---|---|
| 3,808,300 | 4/1974 | Miyamoto et al. | 265/53 |
| 3,814,779 | 6/1974 | Wiley | 264/53 |
| 3,886,100 | 5/1975 | Yasuda et al. | 260/2.5 B |
| 3,936,518 | 2/1976 | Soda et al. | 264/45.5 |
| 3,936,907 | 2/1976 | Jansons . | |
| 3,938,661 | 2/1976 | Carmody | 206/523 |
| 3,949,028 | 4/1976 | Murakami et al. | 264/22 |
| 3,953,558 | 4/1976 | Hatano et al. | 264/22 |
| 3,954,929 | 5/1976 | Hoenke | 264/51 |
| 3,959,189 | 5/1976 | Kitamori | 260/2.5 B |
| 3,960,784 | 6/1976 | Rubens | 260/2.5 B |
| 3,965,054 | 6/1976 | Nojiri et al. | 260/25 HA |
| 3,966,381 | 6/1976 | Suh | 425/376 |
| 3,976,530 | 8/1976 | Callan | 156/306 |
| 3,996,171 | 12/1976 | Holland et al. | 260/25 HA |
| 4,019,756 | 4/1977 | Ishida . | |
| 4,025,083 | 5/1977 | Saint . | |
| 4,048,275 | 9/1977 | Usamoto et al. | 264/54 |
| 4,053,341 | 10/1977 | Kleiner et al. | 156/79 |
| 4,058,583 | 11/1977 | Glander et al. | 264/176 R |
| 4,062,712 | 12/1977 | Stark | 156/244 |
| 4,065,086 | 12/1977 | Nakao . | |
| 4,076,698 | 2/1978 | Anderson et al. | 526/348.6 |
| 4,080,344 | 3/1978 | Ikeda et al. | 260/2.5 HB |
| 4,089,818 | 5/1978 | Slocumb | 260/2.5 HA |
| 4,102,720 | 7/1978 | Kaneko et al. | 156/78 |
| 4,102,829 | 7/1978 | Watanabe et al. | 521/81 |
| 4,110,269 | 8/1978 | Ehrenfreund | 521/81 |
| 4,117,195 | 9/1978 | Swarbrick et al. | 428/379 |
| 4,126,598 | 11/1978 | Reighter | 260/37 EP |
| 4,135,691 | 1/1979 | Wiesmann . | |
| 4,140,311 | 2/1979 | Murakami . | |
| 4,142,956 | 3/1979 | Shikinami et al. | 264/159.14 |
| 4,144,822 | 3/1979 | Roberts et al. . | |
| 4,146,598 | 3/1979 | Coyne | 264/22 |
| 4,163,085 | 7/1979 | Kuhnel et al. | 521/96 |
| 4,168,353 | 9/1979 | Kitamori | 521/59 |
| 4,171,132 | 10/1979 | Kassai . | |
| 4,171,847 | 10/1979 | Tukui . | |
| 4,181,647 | 1/1980 | Beach | 264/45.9 |
| 4,181,762 | 1/1980 | Benedyk | 428/97 |
| 4,182,398 | 1/1980 | Salyer et al. | 165/1 |
| 4,203,815 | 5/1980 | Noda et al. | 204/159.2 |
| 4,209,473 | 6/1980 | Coyne | 264/22 |
| 4,211,590 | 7/1980 | Steward et al. | 156/79 |
| 4,215,202 | 7/1980 | Park | 521/81 |
| 4,225,146 | 9/1980 | Takeuchi . | |
| 4,225,650 | 9/1980 | van Brederode et al. | 428/405 |
| 4,226,946 | 10/1980 | Park et al. | 521/98 |
| 4,228,255 | 10/1980 | Fujimoto et al. | 525/288 |
| 4,231,582 | 11/1980 | Moss . | |
| 4,234,531 | 11/1980 | Jocteur | 264/174 |
| 4,241,832 | 12/1980 | Bliss | 206/523 |
| 4,247,651 | 1/1981 | Ohno et al. | 521/92 |
| 4,275,023 | 6/1981 | Shimizu et al. | 260/50 |
| 4,292,106 | 9/1981 | Herschdorfer et al. | 156/243 |
| 4,297,953 | 11/1981 | Shy . | |
| 4,303,756 | 12/1981 | Kajimura et al. | 521/59 |
| 4,303,757 | 12/1981 | Kajimura et al. | 521/59 |
| 4,308,352 | 12/1981 | Knaus | 521/79 |
| 4,333,898 | 6/1982 | Schmidtchen | 264/45.9 |
| 4,337,321 | 6/1982 | Allada | 521/143 |
| 4,347,329 | 8/1982 | Park | 521/79 |
| 4,364,576 | 12/1982 | Kassai . | |
| 4,370,378 | 1/1983 | Zabrocki et al. | 428/339 |
| 4,379,859 | 4/1983 | Hirosawa et al. | 521/59 |
| 4,383,488 | 5/1983 | Macho et al. . | |
| 4,389,514 | 6/1983 | Schmidle et al. | 525/364 |
| 4,395,459 | 7/1983 | Herschdorfer et al. | 428/395 |
| 4,399,087 | 8/1983 | Akiyama et al. | 264/53 |
| 4,429,059 | 1/1984 | Ozutsumi et al. | 521/60 |
| 4,433,029 | 2/1984 | Senda et al. | 428/407 |
| 4,440,703 | 4/1984 | Akiyama et al. | 264/50 |
| 4,443,393 | 4/1984 | Akiyama et al. | 264/53 |
| 4,444,948 | 4/1984 | Hochstrasser | 525/61 |
| 4,446,254 | 5/1984 | Nakae et al. | 521/92 |
| 4,448,901 | 5/1984 | Senda et al. | 521/60 |
| 4,464,425 | 8/1984 | Voigt et al. | 428/35 |
| 4,473,665 | 9/1984 | Martini-Vvedensky et al. | 521/79 |
| 4,504,534 | 3/1985 | Adachi et al. | 428/71 |
| 4,510,031 | 4/1985 | Matsumura et al. | 204/159.2 |
| 4,515,907 | 5/1985 | McCullough et al. | 521/139 |
| 4,526,930 | 7/1985 | Keogh | 525/105 |
| 4,542,164 | 9/1985 | Nishioka et al. | 521/135 |
| 4,554,293 | 11/1985 | Park | 521/81 |
| 4,581,383 | 4/1986 | Park | 521/91 |
| 4,591,606 | 5/1986 | Bergstrom | 521/79 |
| 4,592,468 | 6/1986 | Wallace | 206/387 |
| 4,605,682 | 8/1986 | Park | 521/81 |
| 4,633,361 | 12/1986 | Ela et al. | 361/145 |
| 4,640,933 | 2/1987 | Park | 521/94 |
| 4,652,588 | 3/1987 | Park | 521/94 |
| 4,663,361 | 5/1987 | Park | 521/96 |
| 4,666,946 | 5/1987 | Fudge | 521/59 |
| 4,692,471 | 9/1987 | Fudge | 521/59 |
| 4,694,025 | 9/1987 | Park | 521/88 |
| 4,694,027 | 9/1987 | Park | 521/94 |
| 4,702,868 | 10/1987 | Pontiff et al. | 264/50 |
| 4,709,817 | 12/1987 | Keady et al. | 206/523 |
| 4,714,716 | 12/1987 | Park | 521/80 |
| 4,725,492 | 2/1988 | Yazaki et al. | 428/317.7 |
| 4,735,392 | 4/1988 | Farmer . | |
| 4,739,547 | 4/1988 | Tanaka et al. | 29/451 |
| 4,759,992 | 7/1988 | Tomko et al. | 428/447 |
| 4,762,860 | 8/1988 | Park | 521/88 |
| 4,767,814 | 8/1988 | Bae et al. | 524/284 |
| 4,791,143 | 12/1988 | Tanaka et al. | 521/89 |
| 4,791,147 | 12/1988 | Tanaka et al. | 521/134 |
| 4,818,789 | 4/1989 | Tomko et al. | 525/64 |
| 4,824,059 | 4/1989 | Butler | 248/176 |
| 4,837,272 | 6/1989 | Kelley | 525/59 |
| 4,850,913 | 7/1989 | Szabad, Jr. | 441/65 |
| 4,868,044 | 9/1989 | Tanaka et al. | 428/304.4 |
| 4,870,111 | 9/1989 | Donuiff et al. | 521/260 |
| 4,873,042 | 10/1989 | Topcik | 264/211.24 |
| 4,894,877 | 1/1990 | Marsh . | |
| 4,900,490 | 2/1990 | Kozma | 264/54 |
| 4,908,166 | 3/1990 | Salyer | 264/22 |
| 4,918,111 | 4/1990 | Tanaka et al. | 521/89 |
| 4,937,284 | 6/1990 | Bergstrom | 525/57 |
| 4,937,299 | 6/1990 | Ewen et al. . | |
| 4,940,632 | 7/1990 | Nicola et al. | 428/318.4 |
| 4,958,770 | 9/1990 | Mitchell | 239/145 |
| 4,960,830 | 10/1990 | Hazelton et al. | 525/196 |
| 5,026,736 | 6/1991 | Pontiff | 527/60 |
| 5,047,476 | 9/1991 | Keogh | 525/106 |
| 5,053,446 | 10/1991 | Salyer | 524/8 |
| 5,064,802 | 11/1991 | Stevens et al. | 502/155 |
| 5,064,903 | 11/1991 | Peiffer | 525/196 |
| 5,086,121 | 2/1992 | Hazelton et al. | 525/197 |
| 5,093,206 | 3/1992 | Schoenbeck | 428/521 |
| 5,098,778 | 3/1992 | Minnick | 428/285 |
| 5,112,919 | 5/1992 | Furrer et al. | 525/263 |
| 5,132,380 | 7/1992 | Stevens et al. | 526/126 |
| 5,149,574 | 9/1992 | Gross et al. | 428/116 |
| 5,151,204 | 9/1992 | Struglinski | 252/52 R |
| 5,186,851 | 2/1993 | Gutierrez et al. | 252/49.006 |
| 5,206,075 | 4/1993 | Hodgson, Jr. | 428/216 |
| 5,210,150 | 5/1993 | Prejean | 525/329.7 |
| 5,246,783 | 9/1993 | Spenadel et al. | 428/461 |
| 5,268,115 | 12/1993 | Gutierrez et al. | 252/51.5 |
| 5,272,236 | 12/1993 | Lai et al. | 526/348.5 |

| | | | |
|---|---|---|---|
| 5,275,747 | 1/1994 | Gutierrez et al. | 252/51.005 |
| 5,277,833 | 1/1994 | Song et al. | 252/56 |
| 5,278,264 | 1/1994 | Spaleck et al. | 526/127 |
| 5,278,272 | 1/1994 | Lai et al. | 526/348.5 |
| 5,288,762 | 2/1994 | Park et al. | 521/79 |
| 5,304,580 | 4/1994 | Shibayama et al. | 521/150 |
| 5,318,649 | 6/1994 | Nishino et al. | 156/244.27 |
| 5,322,728 | 6/1994 | Davey et al. | 428/296 |
| 5,329,033 | 7/1994 | Spaleck et al. | 556/53 |
| 5,340,840 | 8/1994 | Park et al. | 521/60 |
| 5,345,002 | 9/1994 | Song et al. | 568/793 |
| 5,350,817 | 9/1994 | Winter et al. | 526/119 |
| 5,366,647 | 11/1994 | Gutierrez et al. | 252/51.5 |
| 5,369,136 | 11/1994 | Park et al. | 521/143 |
| 5,370,229 | 12/1994 | Kroeckel et al. | 206/523 |
| 5,376,428 | 12/1994 | Palazzoto et al. | 428/143 |
| 5,380,810 | 1/1995 | Lai et al. | 526/352 |
| 5,382,698 | 1/1995 | Song et al. | 568/3 |
| 5,385,972 | 1/1995 | Yamamoto et al. | |
| 5,387,620 | 2/1995 | Park et al. | |
| 5,391,629 | 2/1995 | Turner et al. | |
| 5,398,377 | 3/1995 | Takiyama | |
| 5,407,965 | 4/1995 | Park et al. | |
| 5,408,004 | 4/1995 | Lai et al. | 525/240 |
| 5,451,093 | 9/1995 | Petrie et al. | |
| 5,461,110 | 10/1995 | Arthurs et al. | 525/71 |
| 5,589,519 | 12/1996 | Knaus | 521/60 |
| 5,604,033 | 2/1997 | Arthurs et al. | 428/350 |
| 5,604,288 | 2/1997 | Furukawa et al. | 524/493 |
| 5,612,510 | 3/1997 | Hildreth | 174/120 SC |

POLYMER STRUCTURES WITH ENHANCED PROPERTIES

BACKGROUND OF THE INVENTION

The invention relates to polymer structures and structural materials.

Polymer structural materials are capable of supporting loads or incurring impact without adversely deforming under these forces. In general, the physical properties required by these applications suggest the use of high density materials, however, high density foams can have rough surfaces and may not be suitable for preventing impact damage to packaged articles or injury due to contact with the hard surface of the material. Softer, low density materials such as polymer foams typically used in these applications can lack sufficient structural support needed in many applications. More specifically, it is desirable for packaging materials to be resilient enough to protect a product, or part of a product, during shipping, but soft enough to prevent damage to the surface of the product, such as marring of a smooth or glossy finish (e.g., that of a painted automobile door). These packaging materials are ordinarily composite structures which have been made of a polyvinylchloride (PVC), corrugated PVC, corrugated polypropylene, corrugated polystyrene, corrugated paper, cardboard, pressboard, or similar stiff material that is lined with a softer material.

A similar situation is encountered in athletic gear, where the material in contact with the user provides support to withstand twisting and pulling forces while avoiding damage to the skin of the user. For example, water sport equipment uses a tough, but soft and flexible, binding mechanism for attaching a piece of sport equipment (e.g., a water ski) to the user. The binding mechanism is ordinarily made up of a solid rubber base—such as high density urethanes, PVC, or rubber or combinations thereof to provide the strength and elongation—having a piece of soft foam attached to the base with an adhesive or glue for the comfort of the user.

In most cases, the structural materials are not easily recycled due to additives (such as adhesives) in the compositions and the nature of some of the other materials used in their construction.

SUMMARY OF THE INVENTION

The invention features polymer structures that have a laminated surface and enhanced physical properties, making them useful for packaging easily damaged articles, athletics, water sports, and gaskets. In general, these structures include a core of a high density material and one or more layers of relatively low density polymer foam covering the core. The foam layer provides improves the softness of the outer surface of the structure, resulting in less damage to articles in contact with the structure. The core can be a solid polymer or a high density polymer foam. The core can be stiff or flexible. Examples of suitable foams are described in U.S. Ser. No. 08/638,122, now U.S. Pat. No. 5,844,009, filed Apr. 26, 1996 and entitled "Cross-Linked Low-Density Polymer Foam," and U.S. Ser. No. 08/639,357, filed Apr. 26, 1996 and entitled "Cross-Linked Polymer Tape," each of which is incorporated herein by reference.

In one aspect, the invention features a laminated structure including a core material having a first surface and a second surface, and a first polymer foam layer laminated to the first surface of the core material. The first polymer foam layer is characterized by: (a) an average foam density between about 1 and 12 pounds per cubic foot and which is less than the density of the core material; and (b) a compression resistance (at 25%) which is less than the compression resistance (at 25%) of the core material. In preferred embodiments, the laminated structure also includes a web or polymer film laminated between the core material and the first polymer foam layer. In other preferred embodiments, the first polymer foam layer has an embossed surface.

In preferred embodiments, the core material includes a foamed polyolefin and has a density of between 12 and 59 pounds per cubic foot (e.g., 35 pcf) and the first polymer foam layer has an average foam density between 2 and 10 pounds per cubic foot (e.g., 6 pcf). Preferably, each of the core material and the first polymer foam layer has a thickness between $1/10$ and $1/2$ inch (e.g., $1/4$ inch). The core material and the first polymer foam layer preferably each include a polyolefin.

In other preferred embodiments, the laminated structure further includes a second polymer foam layer laminated to the second surface of the core material.

The second polymer foam layer is characterized by: (a) an average foam density between about 1 and 12 pounds per cubic foot and which is less than the density of the core material; and (b) a compression resistance (at 25%) which is less than the compression resistance (at 25%) of the core material. In preferred embodiments, the first polymer foam layer and the second polymer foam layer each include a vinyl acetate copolymer.

In preferred embodiments, the core material is a solid polymer (e.g., is not a foam). In other preferred embodiments, the core material has a density of between about 7 and 30 pounds per cubic foot (e.g., is a foam), most preferably between about 12 and 20 pounds per cubic foot. Preferably, the first polymer foam layer has an average foam density of between about 2 and 8 pounds per cubic foot, and the second polymer foam layer has an average foam density of between about 2 and 8 pounds per cubic foot.

In preferred embodiments, the structure has a total thickness between about $3/32$ and $2 1/2$ inch, each of the first polymer foam layer and the second polymer foam layer has a thickness between about $1/32$ and $1/2$ inch, and the core material is a polymer foam having a thickness between about $1/16$ and 2 inch.

In preferred embodiments, the core material, the first polymer foam layer, and the second polymer foam layer each include a polyolefin resin (e.g., a polyethylene, a polypropylene, or a single-site initiated polyolefin resin).

In another aspect, the invention features a method of producing a laminated structure including the steps of providing the core structure and laminating a first polymer foam layer to the first surface of the core structure. Preferably, the laminating step is heat lamination. In preferred embodiments, the method further includes the step of laminating a web or polymer film between the core material and the first polymer foam layer. In other preferred embodiments, the method further includes the step of embossing a pattern on the first polymer foam layer.

In other preferred embodiments, the method of producing a laminated structure further includes the step of laminating a second polymer foam layer to the second surface of the core material. In preferred embodiments, at least one of the laminating steps is heat lamination.

In another aspect, the invention features a packaging system including a laminated structure including a core material having a first surface and a second surface, a first polymer foam layer laminated to the first surface of the core material, and a second polymer foam layer laminated to the second surface of the core material.

In preferred embodiments, the packaging system includes at least two sheets, each sheet being a laminated structure having a length, a width, and a thickness at least one elongated slot extending from an edge of the sheet a distance less than the width of the sheet. The slot has a width approximately equal to the thickness of the sheet. The two sheets interlock by sliding the slot of a first sheet into the slot of a second sheet. Preferably, each of the sheets further includes a notch opposite the slot and a tab in the slot for engaging the notch when the sheets are interlocked.

In another aspect, the invention features a water sport boot including a core material having a first surface and a second surface; and a first polymer foam layer laminated to the first surface of the core material. The core material is characterized by a density of between 12 and 59 pounds per cubic foot and a thickness between 1/10 and 1/2 inch. The first polymer foam layer is characterized by an average foam density between about 2 and 10 pounds per cubic foot, a compression resistance (at 25%) which is less than the compression resistance (at 25%) of the core material, and a thickness between 1/10 and 1/2 inch.

In preferred embodiments, the core material of the water sport boot has a density of about 35 pounds per cubic foot and a thickness of about 1/4 inch and the first polymer foam layer has an average foam density of about 6 pounds per cubic foot and a thickness of about 1/4 inch. In other preferred embodiments, the water sport boot further includes a web or polymer film laminated between the core material and the first polymer foam layer. In other preferred embodiments, the first polymer foam layer has an embossed surface.

The components of the laminated polymer structures can include a variety of polyolefins in the composition, including single-site initiated polyolefin resins. Single-site initiated polyolefin resins include polyolefins prepared from a single-site initiator that have controlled molecular weights and molecular weight distributions. The polyolefin can include a polyethylene, polypropylene, polystyrene, or a copolymer of ethylene and alpha-unsaturated olefin monomers. Polyethylenes include ethylene-containing polyolefins.

Copolymers include polymers resulting from the polymerization of two or more monomeric species, including terpolymers (e.g., resulting from the polymerization of three monomeric species), sesquipolymers, and greater combinations of monomeric species. Copolymers are generally polymers of ethylene with $C_3$–$C_{20}$ alpha-olefins, and/or diolefins.

The average foam densities can be measured according to ASTM-D3575, for example.

The polymer resins in the laminated polymer structures can be cross-linked. Cross-linking can occur by high energy irradiation, most preferably electron beam irradiation, peroxide treatment, or silane-grafting and cross-linking by treatment with water. Silane-grafting generally involves attaching one or more silicon-containing monomer or polymer to the original polymer chains. The use of silane-grafting for cross-linking in polymer foams is described, for example, in U.S. Ser. No. 08/805,686, now U.S. Pat. No. 5,883,145 which is a continuation of U.S. Ser. No. 08/308,801, abandoned filed Sep. 19, 1994 and entitled "Cross-Linked Foam Structures of Essentially Linear Polyolefins and Process for Manufacture," which is incorporated herein by reference, in U.S. Ser. No. 08/638,122, now U.S. Pat. No. 5,844,009 and in U.S. Ser. No. 08/639,357. The preferred polymer resins are cross-linked silane-grafted resins.

The polymer resins can be lightly cross-linked, meaning that a relatively low level of cross-linking is incorporated in the resin to help control the processing behavior of the polymer resin. This low level of cross-linking may not be detected by normal test methods such as solvent extraction and, therefore, can be difficult to quantify by means other than processing behavior. Light cross-linking can be produced by addition of a small amount (e.g., less than 0.2 percent) of an organic peroxide, by silane grafting, or by exposing the polymer resin to high energy radiation.

The foams of the laminated polymer structures are generally closed-cell foams. Closed-cell foams are greater than approximately 70% of the foam cell volumes have cell walls isolating them from the external atmosphere. One way to determine this is by measuring the amount of water that is absorbed into the foam when the foam is immersed in water.

The invention can have one or more of the following advantages. Laminated polymer structures are useful in the areas of packaging, athletic gear (such as padding and water sport equipment), gaskets, and protective apparel. The laminated polymer structures have soft outer layers that meet many packaging and athletic gear needs.

For packaging, the laminated polymer structure is stiff enough to separate the items requiring packaging protection (e.g., as a divider). The laminated polymer structure is also sturdy enough to cushion the item to prevent damage from impact or compression. The outer surface of the laminated polymer structure that is in contact with the item is soft enough to prevent scratching or marring of a high quality surface (e.g., a painted, polished, or otherwise easily damaged surface) of the item.

For athletic gear, the laminate polymer structures are an alternative material which physically performs comparably to high density rubber composites, but is lighter in weight. The flexible, high density core is a foam that includes a cross-linked single-site initiated polyolefin resin which can match or exceed the toughness, softness, and flexibility criteria required for the application at a much lower density than the traditional high density rubber composites. The high density core has a tensile strength of between about 400 and 600 psi, an elongation at break of between 250 and 500 percent, compression deflection (at 25%) of between 80 and 250 psi, and a tear die C of between 80 and 150 pli.

The terms stiff and flexible are normally quantified in foam materials by their compression deflection as tested according to ASTM-D3575. These terms are relative. For example, a cross-linked 4 pcf foam having a compression deflection (at 25%) of approximately 6 psi is a flexible foam relative to a 14 pcf foam having a compression deflection (at 25%) of approximately 70 psi, which qualifies as a stiff foam.

Further, foams including silane-grafted single-site initiated polyolefin resins generally have lower foam densities while retaining good strength and other physical properties. See, for example, U.S. Ser. No. 08/638,122 now U.S. Pat. No. 5,844,009 or U.S. Ser. No. 08/639,357. By lowering the average density and improving the physical properties of the laminated polymer structures, laminated structures that contain less material can be obtained. This can decrease the total cost of the materials and decreases wasted material compared to non-laminated structures.

In addition, the laminated polymer structures can be composed predominantly of ecologically friendly material (i.e., lack chlorine, sulfur, or leachable agents such as plasticizers) and can be completely recyclable (e.g., by melt processing). In addition, the laminated polymer structures are preferably laminated with heat only. Heat lamination eliminates the need to apply any adhesive, epoxy lamination materials, urethane underlayers, or any other material to join the structure components. The foam materials can be pigmented to any virtually color for aesthetics and color matching. The materials are weather resistant to sunlight and UV degradation. The outer surfaces of the laminated structures can be embossed with a pattern or die cut to give a desired shape.

Other features and advantages of the invention will be apparent from the following detailed description thereof, and from the claims.

DETAILED DESCRIPTION

The laminated polymer structures include a core material having a high density and one or more layers of a foam having a low density relative to the core material that are laminated to a surface of the core material. The core material has a foam layer on at least one surface and can have a second foam layer laminated to another surface of the core material. For example, the structure can be a polymer sheet with a foam layer laminated to each side of the sheet. The outer surface of the foam layer can be embossed with a pattern. The lamination can be accomplished using any conventional lamination technique, including heat, film, or adhesive lamination. The laminated construction particularly improves the physical properties of the surface of the core material, such as increasing the softness and decreasing the abrasiveness of the surface.

The laminated polymer structures can be composed of polyethylene, polypropylene, or a polyolefin alloy such as polystyrene/polyethylene, polyethylene/polypropylene, or polystyrene/polyethylene/polypropylene. The polymers can include single-site initiated polyolefin resins. The polymers can be cross-linked or non-cross-linked. The core material can be a solid polymer or a foam. The laminated structures can have a foam layer on one or two sides of the core material depending on cost restrictions and the application.

The preferred foam layers are described, for example, in U.S. Ser. No. 08/639,357, and have average foam densities of between about 1 and 12 pounds per cubic foot (pcf), preferably between about 2 and 8 pcf, and thicknesses between 1/32 and 1/2 inch. The foam layer is a polyolefin resin or polyolefin blend, preferably including at least one single-site initiated polyolefin resin. The foam layers are fine celled, smooth surface foams.

For packaging applications, the preferred core materials are polyethylene foams described, for example, in U.S. Ser. No. 08/638,122. The preferred core foam has an average foam density of between 7 and 30 pcf, preferably between about 15 and 20 pcf. The core material is stiff. Alternatively, the core material can be a laminate including multiple foam layers or a solid, non-foamed polymer. The total thickness of the core layer is determined by the overall thickness requirement of the application of the laminated polymer structure. The preferred foam layer includes an ethylene-vinyl acetate copolymer. The total thickness of the laminated polymer structure is, most preferably, between about 1/16 and 2 inch. Preferably, the core materials are in the form of foam sheets, planks, or roll stock.

For other applications, such as in athletic gear, the core material is a flexible, tough foam having an average foam density of between 7 and 59 pcf, preferably approximately 35 pcf. The core material preferably includes at least one single-site initiated polyolefin resin, an ethylene-propylene rubber, and an ethylene-vinyl acetate copolymer. The laminated structure can include a reinforcing web or film laminated between core material and foam layer for added structural stability. The web or film is a thin gauge material, preferably a wider mesh material including polyethylene, polypropylene, a polyester, a nylon, or similar material. The web or film is laminated between the foam sheets during the lamination process.

The foam layers or core materials have a broad range of physical properties, including average foam densities and stiffness. The density of the core is selected to provide the desired rigidity (stiffness) or flexibility and support to the structure. Suitable core materials have tolerable compression deflection or resistance to constant, intermittent or impact loads. The density of the foam layer is selected to be the minimum density that will resist impact or compression damage. The foam layers allow the use of stiffer core materials that otherwise would damage the item in contact with the surface of the structure. Tensile strength and tear strength of the foams are not particularly important characteristics to consider in selecting the foams. The preferred densities of the foam layer and core material are the densities that provide a structure with the properties for the application.

The foam lamination can be achieved by heating the laminate interface or by film lamination. Although not preferred, in some applications, glues or adhesives can be used in place of or in combination with heat lamination. The lamination techniques are generally well known in the sheet fabrication industries. Heat lamination is a process in which two foam surfaces or other sheet material are brought together under pressure and heat to join the materials. In practice, foam is taken from roll stock or sheets having the appropriate thickness. Roll stock can have dimensions of approximately 48 inch width and up to 400 feet in length. The foams are fed together, surface to surface, with pressure exerted by two turning rollers. Immediately prior to the materials meeting in the nip of the rollers, heat is applied to the surfaces which are about to be pressed together. The heat can be supplied by hot air blowers or guns, gas-fired flames, infrared heaters, or a combinations thereof. Heat can be applied to both foam surfaces, or only to one. The heat partially melts the surface polymer and is controlled to melt only the surface of the foam without melting the bulk material. The foam surfaces pass through the cooling roller nips in this partially melted state and are joined by a bond upon cooling.

Alternatively, a similar laminate can be made by applying an adhesive to one or both sheets prior to the foam passing through the nip rollers, or by extrusion of a thin continuous layer of polymer onto one surface immediately prior to the foam passing through the nip rolls. By choosing a film material which is compatible with the substrates, a laminate is formed. Adhesives can include, but are not limited to, rubber, epoxy, and acrylic adhesives which can be applied by conventional coating techniques including reverse roll coating, knife over roll coating, or extrusion coating. Heat and film lamination methods are preferred since those methods can avoid the use of solvents in the lamination process and can provide highly recyclable materials.

The outer surface of the foam layer can be embossed with a pattern before or after lamination. The embossing process is similar to the lamination process, where the surface to be embossed is heated surface and the material is then passed between a chilled embossing roll and a nip roll so that the heated surface contacts the embossing roll. The embossing roll has a relief pattern that is transferred to the surface of the foam. The surface of the foam retains the embossed pattern under normal wear at normal room and outdoor temperatures.

Assorted shapes can be cut for the laminated polymer structures with either solid or foamed cores. The shape is configured to fit in an end product. Alternatively, the shape is configured to be folded and joined to itself for specific applications. For example, the laminated polymer structure can be cut and have sections removed so that it can interlock with itself or other shapes to form a three-dimensional structure useful for packaging materials. In another example, the cut shape of a flexible laminated polymer structure can be bent and fastened to the surface of a water sport board to serve as a boot part for rider use.

Cutting of shapes can be achieved by hand using knives or scissors. A more efficient method is to use sharpened steel rule dies of forged dies to cut the entire shape all at once. A hydraulic press, or a "Clicker" type press, operating at pressures between 50 and 150 psi and at room temperature, can be used to press the die into the laminated polymer structure. Once the press has forced the die through the material, completely severing it from the rest of the structure, the "puzzle-like" piece is removed for use.

Figure 1:
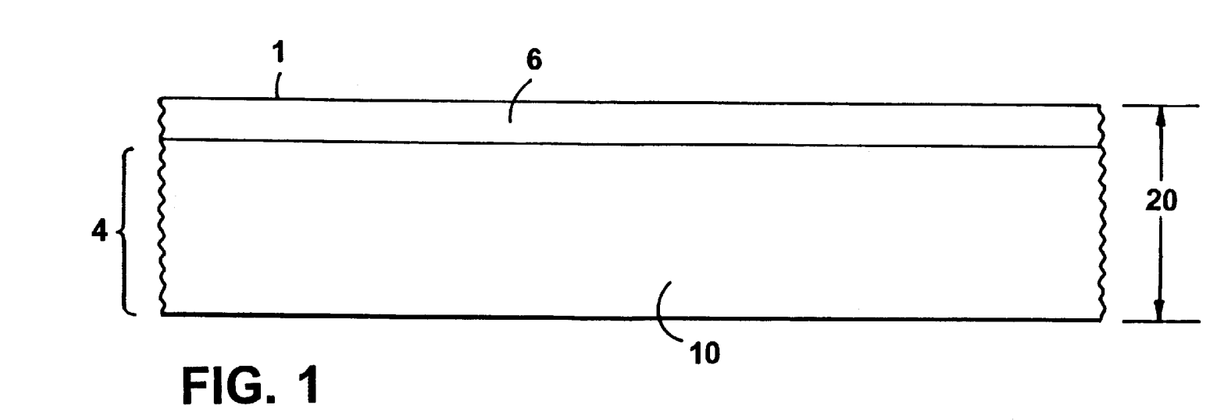
FIG. 1 is a cross-sectional view of a laminated polymer structure having a high density core and one low density foam layer.
Figure 2:
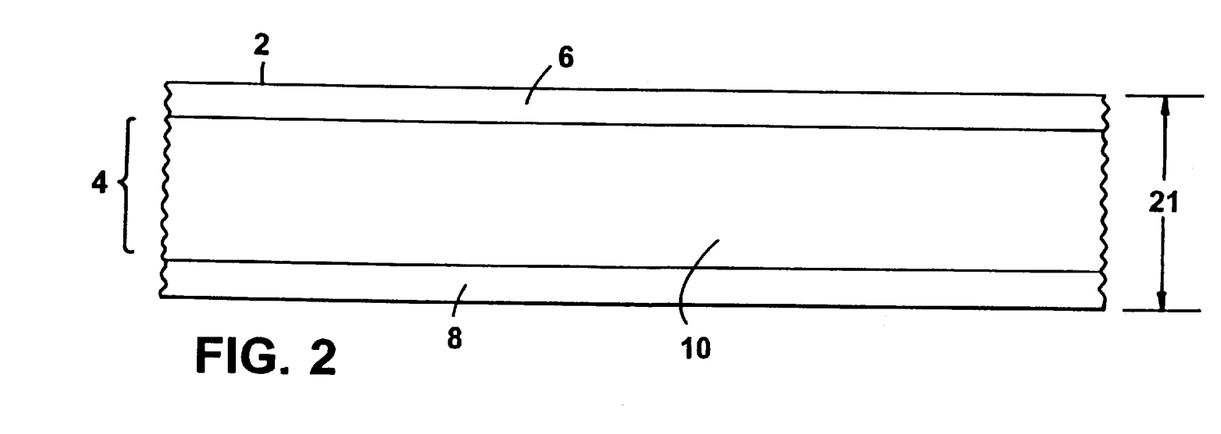
FIG. 2 is a cross-sectional view of a laminated polymer structure having a high density core and two low density foam layers.

Particularly preferred laminated polymer structures are described and illustrated in FIGS. 1 and 2.

Referring to FIG. 1, laminated polymer structure 1 has core 4 laminated to first foam layer 6 on one surface of core 4. Layer 6 is a polymer foam having an average density of between 1 and 12 pounds per cubic foot and a thickness of between 1/32 and 1/2 inch. Core 4 is a polymer foam 10 or a laminate of multiple polymer foams having an average foam density that is high relative to layer 6 in the range of 7 and 59 pounds per cubic foot and a thickness between 1/16 and 2 inch. For packaging applications, the core has a density of between 7 to 30 pounds per cubic foot and is stiff. Structure 1 has a total thickness 20 which is generally between about 3/32 and 2½ inch.

Referring to FIG. 2, laminated polymer structure 2 has core material 4 laminated to first foam layer 6 on one surface and to a second foam layer 8 on a second surface of core 4. Layer 6 and layer 8 are generally foams having average densities of between 1 and 12 pounds per cubic foot and thicknesses of between 1/32 and 1/2 inch. Core 4 is a foam (or laminated foam) having an average foam density of between 7 and 30 pounds per cubic foot and a thickness of between 1/8 and 3/8 inch. Structure 2 has a total thickness 21 which is generally between about 1/16 and 2 inch.

Figure 3:
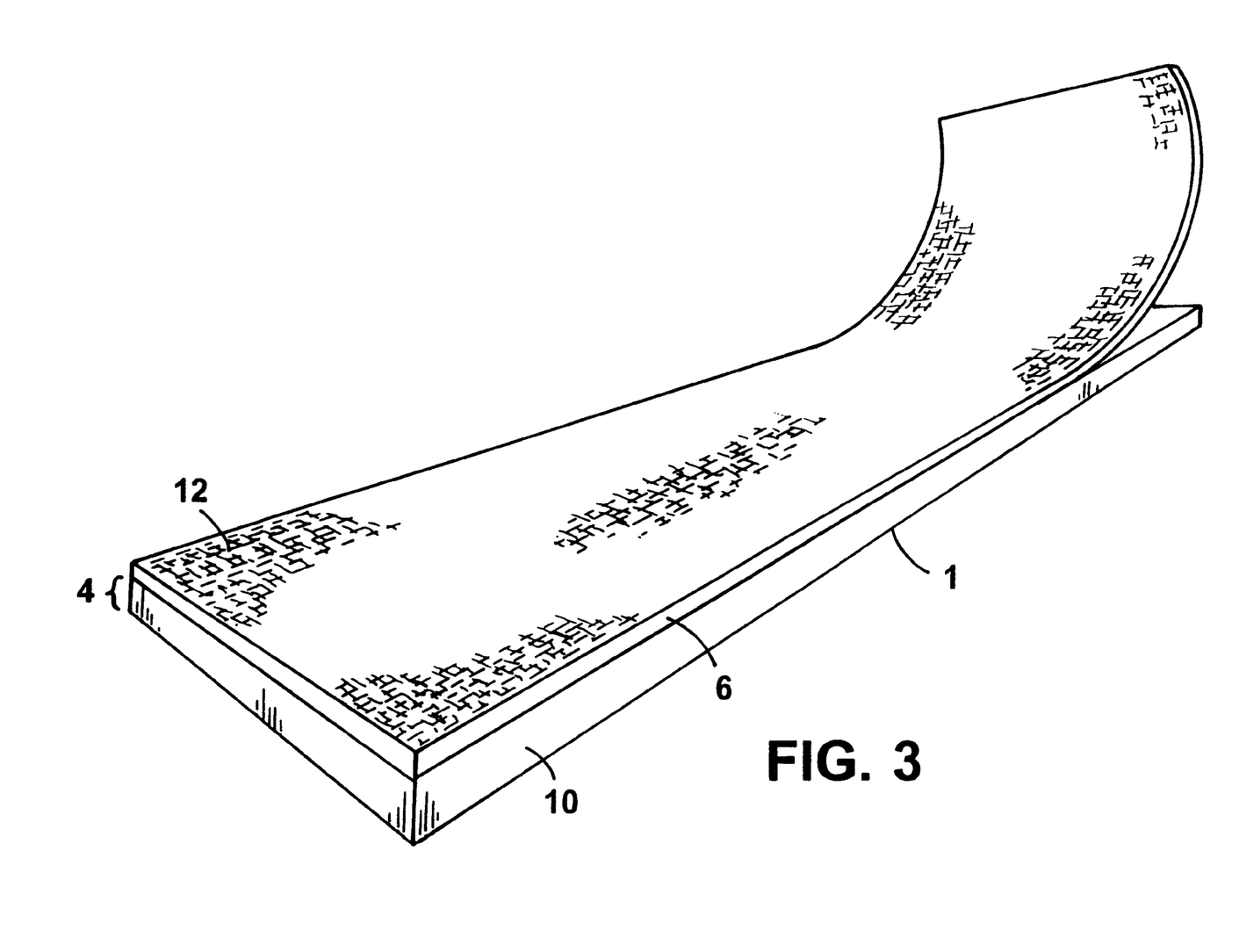
FIG. 3 is a perspective view of a laminated polymer structure having a high density core and one low density foam layer with an embossed surface.

Referring to FIG. 3, the outer surface 12 of first foam layer 6 can have an embossed pattern. The embossed pattern can contribute to comfort and safety when the laminated polymer structure 1 by increasing the softness of the surface and providing grip. In these athletic gear applications, layer 6 is a polymer foam having an average density of between 2 and 10 pounds per cubic foot and a thickness of between 1/10 and 1/2 inch. Core 4 is a flexible polymer foam 10 having an average foam density that is high relative to layer 6 in the range of 7 and 59 pounds per cubic foot and a thickness between 1/10 and 1/2 inch.

Figure 4:
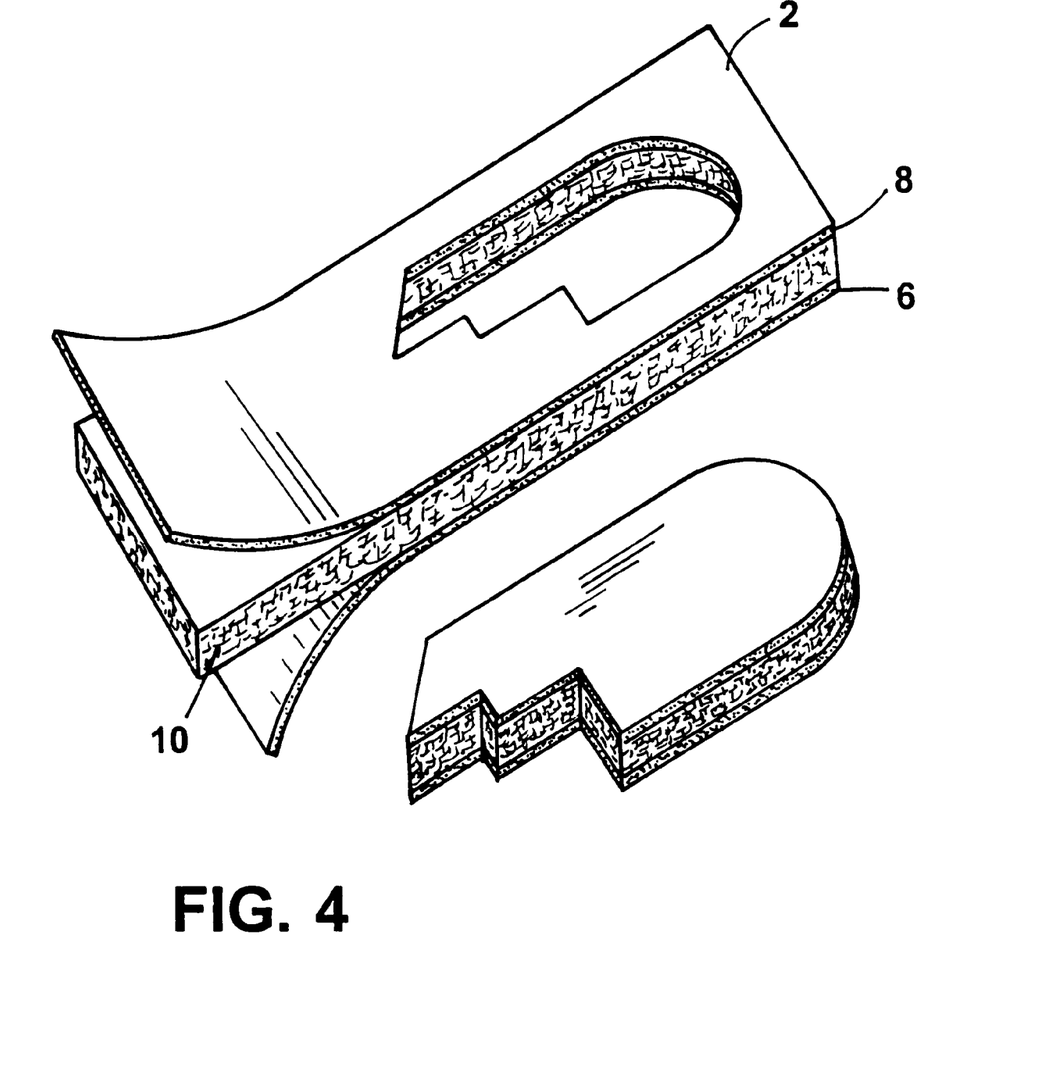
FIG. 4 is a drawing depicting a shape die cut from a laminated polymer structure.

Referring to FIG. 4, the laminated polymer structures can be die cut to give a defined shape. For example, a die cut shape can be made by pressing a sharp form through laminated polymer structure 2. The high density of core material 10 can contribute to the ability to die cut the structure cleanly and efficiently.

Figure 5:
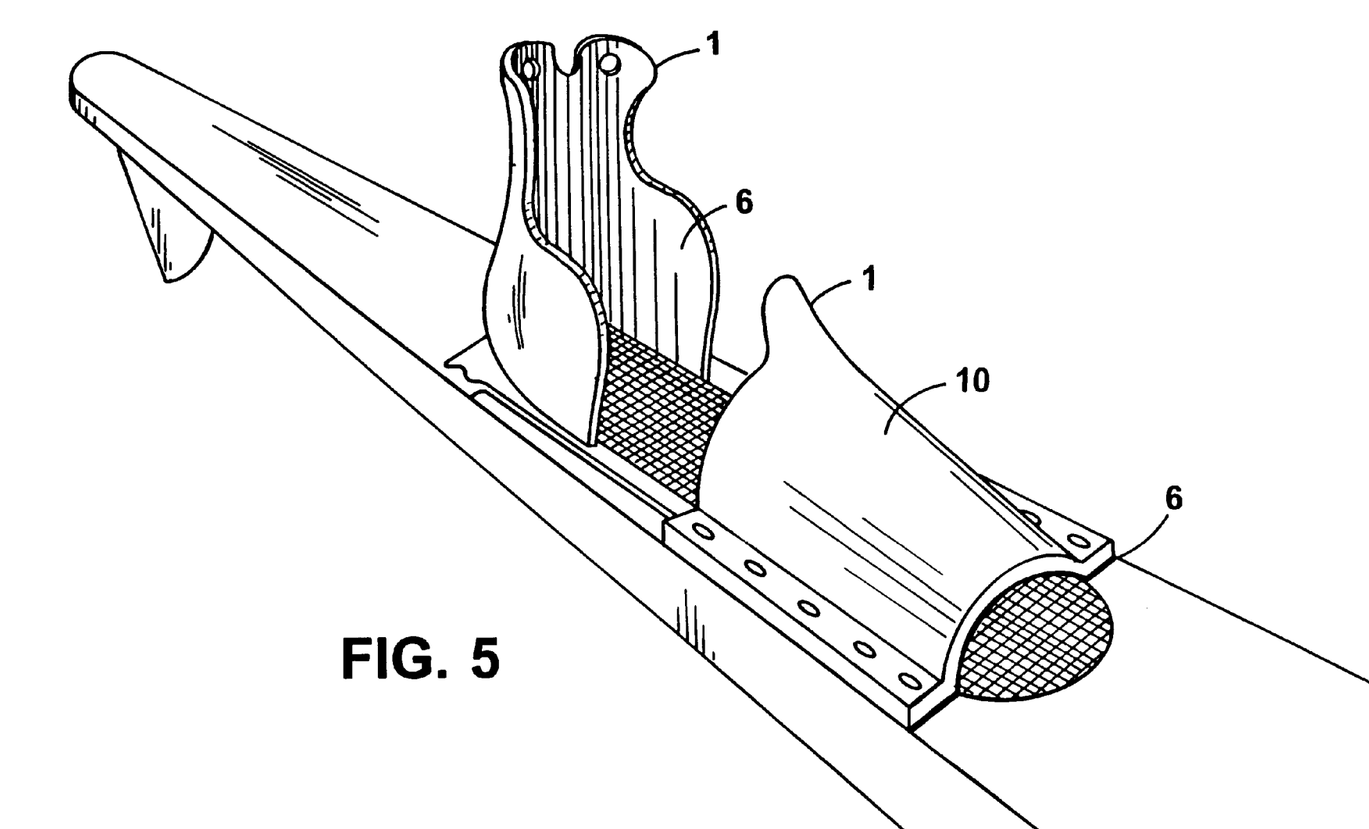
FIG. 5 is a drawing depicting an athletic article including the laminated polymer structure.

Referring to FIG. 5, laminated polymer structure 1 having an embossed surface as shown in FIG. 3 can be used to make a boot for a water ski. Laminated polymer structure 1 is die cut into the proper form. The die cut shapes are configured so that the soft foam layer 6 having the embossed pattern are on the inside of the boot so that it can directly contact the foot of the user. The higher density foam 10 is on the outside of the boot to provide support and protection to the user. The flexibility of core of the laminated polymer structure used in the boot provides the strength and elongation needed to stretch the boot over the bare foot of the user and grip the foot within the boot. Softness to the user is provided by the foam layer laminated on the inside of the boot so that it touches the foot of the user. The core oriented on the outside of the boot is tough surface that is resistant to abrasion and tearing.

Figure 6:
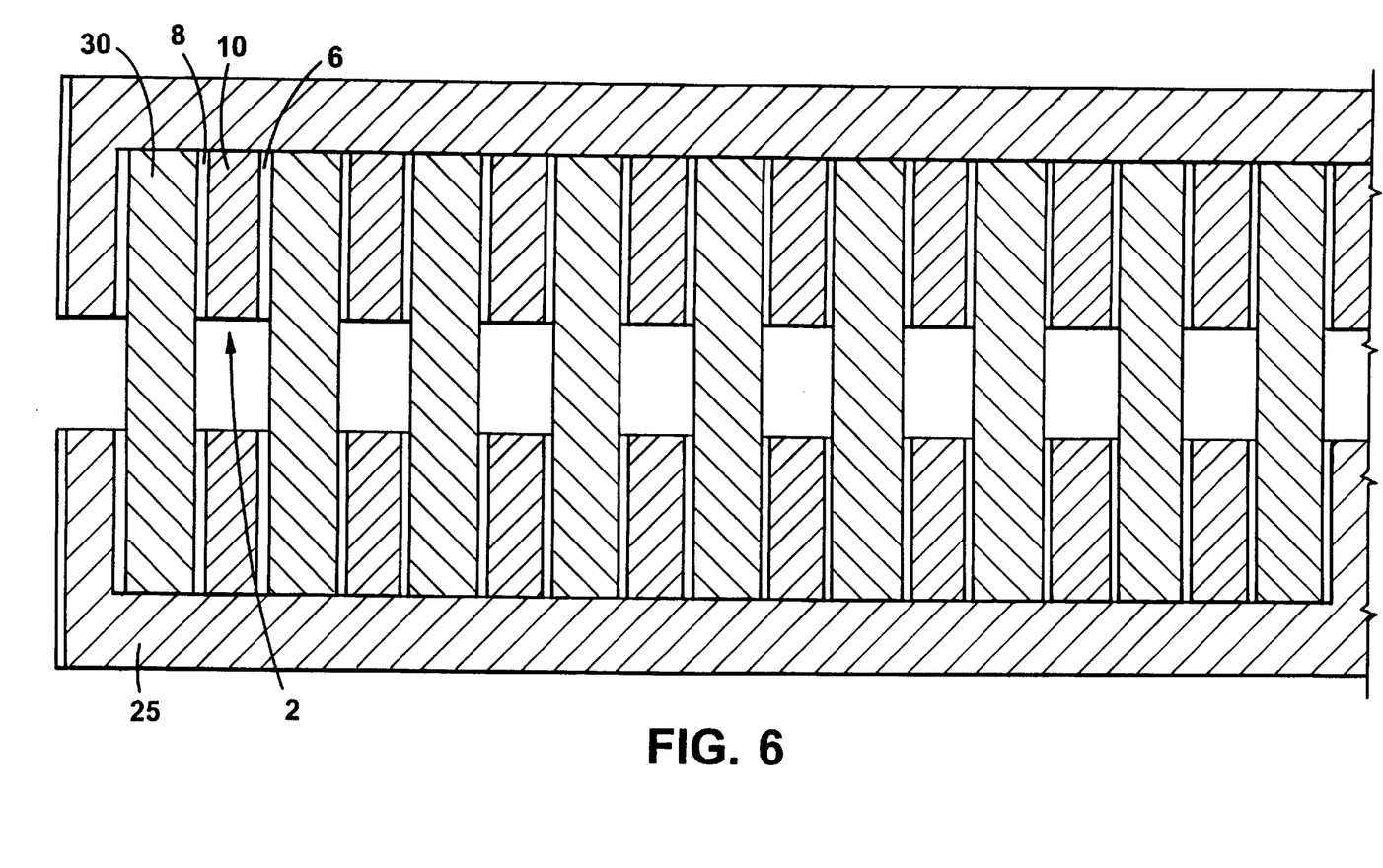
FIG. 6 is a cross-sectional view of a packaging system including the laminated polymer structure.

The laminated polymer structures can be provided as sheets that are die cut for packaging applications. For example, sheets can be cut to fit reusable shipping container or totes. Referring to FIG. 6, a plurality of pieces of laminated polymer structure 2, including core material 10 and foam layers 6 and 8, are secured in container 25 at regular intervals along the length of the container. The intervals between the foam pieces are spaced appropriately to hold article 30, which can be, for example, a mirror. The softer foam layers 6 and 8 are in direct contact with the surfaces of the mirror, protecting them from marring or abrasion.

Figure 7:
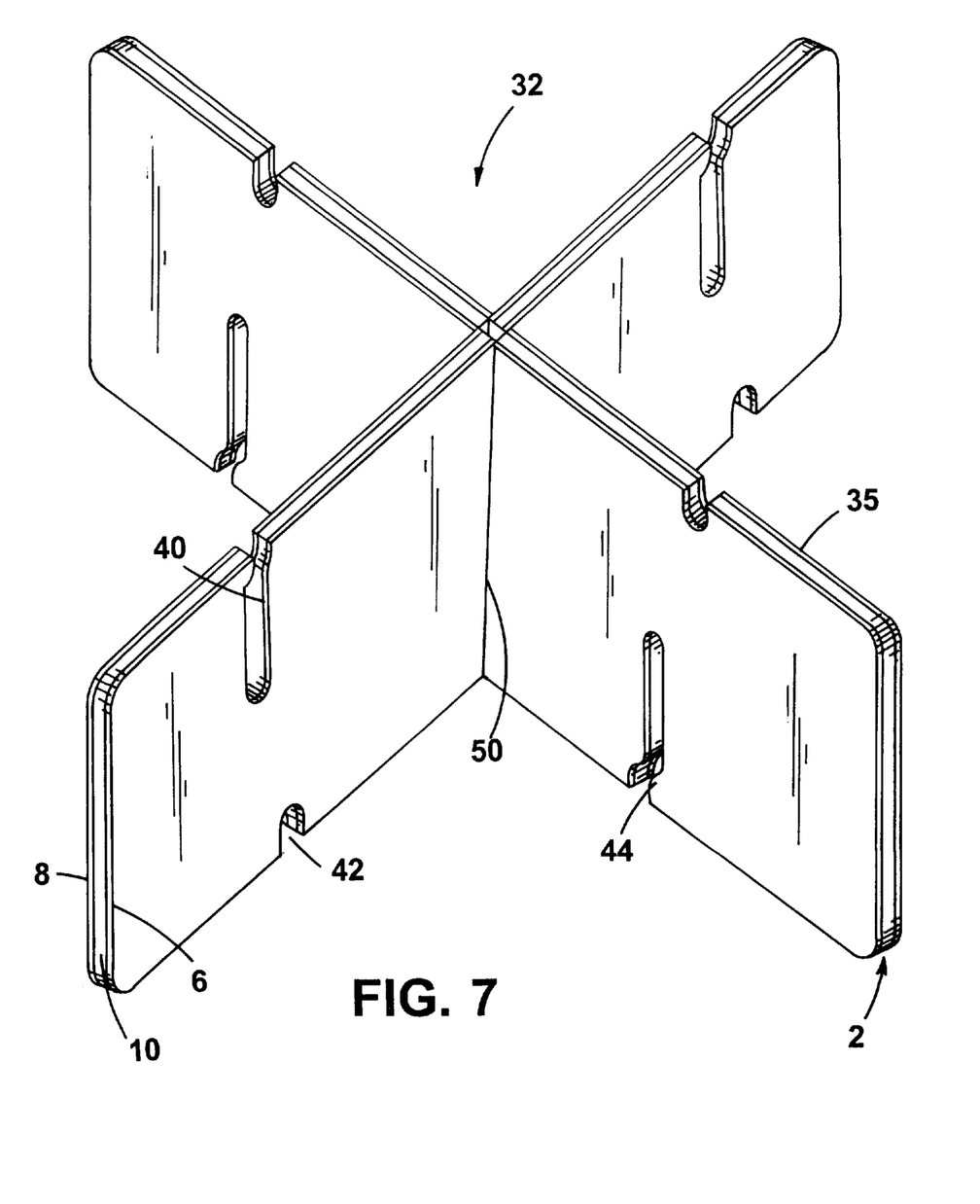
FIG. 7 is a perspective view of a packaging system including the laminated polymer structure.
Figure 8:
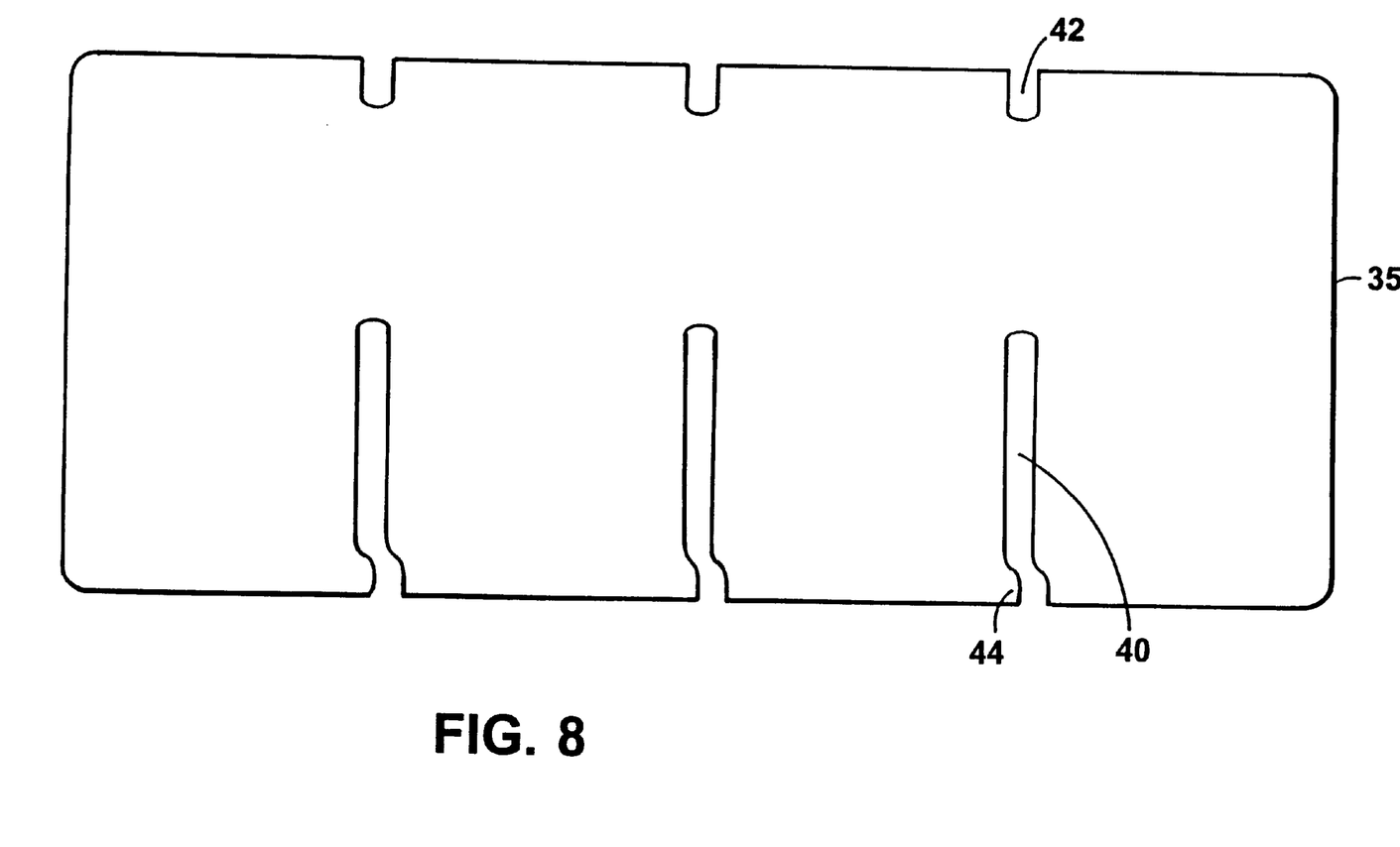
FIG. 8 is a side view of a sheet of the laminated polymer structure of the packaging system shown in FIG. 7.

Referring to FIGS. 7 and 8, packaging system 32 is constructed from at least two die cut pieces 35 that interlock by a notch and groove assembly. Packaging system 32 can be inserted into a box or other container to form compartments for holding items. Die cut piece 35 is a sheet of laminated polymer structure 2, including core material 10 and foam layers 6 and 8 on the surfaces of core 10. Die cut piece 35 is generally rectangular and has dimensions suitable for fitting into a box or other container.

Piece 35 has groove 40 on one side that extends approximately half of the width of piece 35 and notch 42 directly opposite to it. The end of groove 40 includes tab 44, located at the side of piece 35 that interlocks with notch 42 when two pieces are connected. The number of notches and grooves shown in FIGS. 7 and 8 are not limited to three per piece as shown. There can be more or fewer, depending on the container and compartment sizes needed for a particular application.

A first piece 35 and a second piece 35 are interconnected by sliding groove 40 of first piece 35 into groove 40 of second piece 35 so that each tab 44 of one piece 35 engages notch 42 of the other to form joint 50. Multiple die cut pieces, such as piece 35, can be interconnected to form packaging systems having more compartments than the 4 compartments shown in this example.

In packaging applications, the laminated polymer structures can act as protective packaging layers for transporting (e.g., in-process automotive parts, fruits and vegetables, glass and ceramic objects) where strength and durability of the dividers along with surface softness is required. Alternatively, the laminated polymer structures can be used to prepare other shapes and forms of shipping containers and container inserts.

The laminated polymer structures are not limited solely to applications in the packaging or athletic gear areas. There numerous other applications where a material having a stiffer core and a softer surface foam could be beneficial. Some applications include, but are not limited to, protective equipment (e.g., crash helmet linings, athletic padding, protective apparel), costume clothing, and gasket applications.

The foam layers are generally foamed polymers and polymer blends. The core material can be a foamed or solid polymer. Examples of suitable polymers include single-site initiated polyolefins, low density polyethylene (LDPE), high density polyethylene (HDPE), linear low density polyethylene (LLDPE), ethylene-propylene rubber, ethylene-propylene-diene monomer terpolymer (EPDM), polystyrene, polyvinylchloride (PVC), polyamides, polyacrylates, celluloses, polyesters, polyhalocarbons, and copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, or methacrylic acid. The polymer blends can also include rubber materials such as polychloroprene, polybutadiene, polyisoprene, polyisobutylene, nitrile-butadiene rubber, styrene-butadiene rubber, chlorinated polyethylene, chlorosulfonated polyethylene, epichlorohydrin rubber, polyacrylates, butyl rubber, or halobutyl rubber. The rubber material can be peroxide-cured or vulcanized. Preferred resins include single-site initiated polyolefins, LDPE, LLDPE, polypropylene, polystyrene, or ethylene copolymers such as ethylene-vinyl acetate copolymer (EVA), ethylene-ethyl acrylate copolymer (EEA), ethylene-propylene rubber (EPR), or ethylene-propylene-diene monomer rubber (EPDM).

The foam layer or core material can include blends containing single-site initiated polyolefin resins and other polymer resins. The single-site initiated polyolefin resin can be silane-grafted before blending with other polymer resins. Alternatively, the blend itself can be silane-grafted. The core material foams can be partially or extensively cross-linked prior to expansion, or can be extensively cross-linked after expansion.

Preferred polymer resins for the foam layers include EVA resins containing between 5 and 20 percent vinyl acetate. When the foam layer contains a polymer blend, the blend can contain up to 80 percent of the other polymer resins. Specifically, when the foam contains EVA, between 20 and 50 percent of the blend with the single-site initiated polyolefin resin can be EVA. Some EVA resins are commercially available from Exxon Chemical Company, Houston, Tex., Rexene Products Company, Dallas, Tex., and Quantum Chemical Company, Cincinnati, Ohio.

The flexible core materials preferably include an EPR or EPDM resin, an EVA resin, and a single-site initiated polyolefin resin.

The preferred core materials are foams that include polyethylene, such as, for example, single-site initiated polyethylenes, very low density polyethylenes (VLDPE), or LDPE. LDPE resins are described, for example, in "PETROTHENE® Polyolefins . . . A Processing Guide," Fifth Edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA.

The single-site initiated polyolefin resins are derived from ethylene polymerized with at least one comonomer selected from the group consisting of at least one alpha-unsaturated $C_3$–$C_{20}$ olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane. The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more $C_4$–$C_{20}$ polyene monomers. Preferably, the polyene is a straight-chain, branched chain or cyclic hydrocarbon diene, most preferably having between 6 and 15 carbon atoms. It is also preferred that the diene be non-conjugated. Examples of such dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

The preferred single-site initiated polyolefin resins include either ethylene/alpha-unsaturated olefin copolymers or ethylene/alpha-unsaturated olefin/diene terpolymers.

Single-site initiated polyolefin resins can be prepared using single-site initiators. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators. The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

When the single-site initiated polyolefins are copolymers, the composition distribution breadth index (CDBI) is generally greater than 50% and most preferably above 70%. The CDBI is a measurement of the uniformity of distribution of comonomers among the individual polymer chains having a comonomer content within 50% of the median bulk molar comonomer content.

Preferred single-site initiated polyolefin resins are described, for example, in S.-Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions.

Some single-site initiated polyolefin resins are available commercially from Exxon Chemical Company, Houston, Tex., under the tradename EXACT™, and include EXACT™ 3022, EXACT™ 3024, EXACT™ 3025, EXACT™ 3027, EXACT™ 3028, EXACT™ 3031, EXACT™ 3034, EXACT™ 3035, EXACT™ 3037, EXACT™ 4003, EXACT™ 4024, EXACT™ 4041, EXACT™ 4049, EXACT™ 4050, EXACT™ 4051, EXACT™ 5008, and EXACT™ 8002. Other single-site initiated resins are available commercially from Dow Plastics, Midland, Mich. (or DuPont/Dow), under the tradenames ENGAGE™ and AFFINITY™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, and D8130 (or XU583-00-01). Most preferably, the single-site initiated polyolefin resins are selected from the group consisting of EXACT™ 3024, EXACT™ 3031, EXACT™ 4049, PL1845, EG8200, and EG8180.

The foams can be cross-linked, however, non-cross-linked foams also can be made. The foams can be cross-linked with peroxides, UV irradiation, or by silane-grafting. The use of silane-grafting for cross-linking in polymer foams is described, for example, in U.S. Ser. No. 08/805,686, which is a continuation of U.S. Ser. No. 08/308,801, and in U.S. Ser. No. 08/638,122.

The foam can preferably be a polymer blend including at least one single-site initiated polyolefin resin. The preferred single-site initiated polyolefin resin is silane-grafted. The preferred level of silane-grafted single-site initiated polyolefin resin, in weight percent of the total polymeric content of the foam, is preferably between about 2 percent and about 30 percent more preferably between about 3 percent and about 18 percent. The single-site initiated polyolefin resin can be silane-grafted before blending with other polymer resins. Alternatively, the foam can be a polymer blend that has been silane-grafted.

Silane-grafting of the polyolefin resin or resin blend occurs when the polymer backbone is activated and reacts with a silane reagent to form the graft copolymer. The silane-graft can include a subsequently cross-linkable moiety in the graft chain. For example, the cross-linking can occur under warm, moist conditions when the cross-linkable moiety is hydrolyzable, optionally in the presence of a suitable catalyst. Levels of cross-linking can be adjusted by varying the amount of silane-grafting introduced to the polymer blend. The silane-grafting can occur in a separate process, or during a continuous blending and extruding process. Silane-grafting is generally accomplished by adding azido- or vinyl-functional silanes and a graft initiator to the polyolefin resin or blend. The grafting of the polyolefin resin or blend can take place, for example, in an extruder. Suitable azido-functional silanes include the trialkoxysilanes such as 2-(trimethoxysilyl) ethylphenylsulfonyl azide and 6-(triethoxysilyl) hexylsulfonyl azide. Suitable vinyl-functional silanes include vinyl-functional alkoxy silanes such a vinyl trimethoxy silane (VTMOS) and vinyl triethoxy silane (VTEOS).

Alternatively, cross-linking can be introduced by reaction of the polymers with peroxides. UV irradiation of the polymers can also be used to introduce cross-linking.

A cross-linking graft can include other monomers, such as di- and tri-allyl cyanurates and isocyanurates, alkyl di- and tri-acrylates and methacrylates, zinc dimethacrylates and diacrylates, styrenes, divinylbenzene, and butadiene.

The graft initiator, or peroxide cross-linking agent can be a free radical generating species, for example, a peroxide. Examples of peroxides include dicumylperoxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy) diisopropylbenzene, 4,4'-bis(t-butylperoxy)butylvalerate, t-butylperbenzoate, t-butylperterephthalate, and t-butyl peroxide. Most preferably, the peroxide is dicumylperoxide or 2,2'-bis(t-butylperoxy)diisopropylbenzene.

The silane-grafted polymer can be cross-linked by exposure to moisture to effect silanol condensation reactions of the hydrolyzable groups of the pendant silane-grafts. Cross-linking develops through hydrolysis of silane groups to form silanols which condense to form siloxanes. The condensation of silanols to siloxanes is catalyzed by metal carboxylates such as, for example, dibutyl tin dilaurate or dibutyl tin maleate. The most preferred silanol condensation catalyst is dibutyl tin dilaurate.

The cross-linking of silane-grafted polymers can be induced by the presence of atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

Regardless of the method of cross-linking used, acceptably flexible articles, particularly foamed articles, can only be obtained in certain ranges of cross-linking density or level, which is related to the amount of silane-grafting in the blend. Too much cross-linking can render the material inelastic. In a foam, this can result in less than optimal expansion and greater than optimal density for a given level of foaming agent. Too little cross-linking can be detrimental to physical properties such as compression set properties or thermal resistance, for example. It is important to choose cross-linking levels that afford materials with particular desired properties. The silane-grafting and resulting cross-links increase the melt strength of the composition. The cross-linking levels can be determined by establishing the gel content of the of the composition, for example, by extraction with a solvent such as xylenes. The foam layers can have cross-link densities ranging from 95 percent gel to a level which is too low to be detected by gel extraction (e.g., <10 percent) but is clearly present due to the properties of the material.

Most preferably, the silane is VTMOS, that is grafted on to the polymer backbone by a reaction which is initiated by 2,2'-bis(t-butylperoxy)diisopropylbenzene. The most preferred silanol condensation catalyst is dibutyl tin dilaurate. The cross-linking can be induced by the presence of atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

Exposure of the compositions to high energy radiation to induce cross-linking can be accomplished at dosages of ionizing radiation in the range of about 0.1 to 40 Megarads, and preferably, at about 1 to 20 Megarads. The amount of cross-linking can be appropriately controlled by adjusting the dosage of high energy radiation.

The core material can be foamed to make foamed core. The foamed cores are predominantly closed-cell foams and can be thermoformed. The expanding medium, or foaming agents, useful in the practice of the present invention, are physical foaming agents or chemical foaming agents. The term "physical foaming agent," as used herein, means a medium expanding composition that is a gas at temperatures and pressures encountered during the foaming step. Typically, a physical foaming agent is introduced to the polymer blend in the gaseous or liquid state and expands, for example, upon a rapid decrease in pressure. The term "chemical foaming agent," as used herein, means a medium expanding composition that is a solid or a liquid under ordinary processing conditions until the composition is decomposed to release gas. Chemical foaming agents can be decomposed, for example, at elevated temperatures.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. Chemical foaming agents include, for example, azodicarbonamide, p-p'-oxybis(benzene) sulfonyl hydrazide, p-toluenesulfonyl hydrazide, p-toluenesulfonyl semicarbazide, 5-phenyltetrazole, ethyl-5-phenyltetrazole, dinitrosopentamethylenetetramine, and other azo, N-nitroso, semicarbazide, sulfonyl hydrazides, carbonate, and bicarbonate compounds that decompose when heated. The preferred foaming agents include azodicarbonamide or isobutane.

Additional additives in the foam compositions can dramatically effect the properties of the foam. These include gas exchange additives and cell nucleating agents, such as zinc stearate and talc, respectively. The preferred gas exchange additive concentration in the foam is between 0.5 and 2.0 percent. The preferred cell nucleating agent concentration in the foam is between 0.05 and 2.0 percent. The foam can also include gas exchange additives, also known as cell-structure stabilizers, such as, for example, fatty acids, fatty acid carboxylate salts (e.g., zinc stearate), fatty acid esters (e.g. glycerol monostearate), or fatty acid amides, assist in the gas exchange process and the aging of the foams.

In particular, processing aids, such as fluorinated elastomers (VITON™, available from DuPont or DYNAMAR™, available from 3M), and anti-block agents, such as talc, silica or calcium carbonate, are added to the polymer foams for the foam layer compositions.

Other additives, alone or in combination, can be added to the foam compositions, including antioxidants (e.g., hindered phenolics such as IRGANOX™ 1010, phosphites such as IRGAFOS™ 168, or polymerized trimethyl-dihydroquinoline such as AGERITE™ AK, RESIN™ D or FLECTOL™ H, ultra-violet stabilizers, thermal stabilizers, antistatic components, flame retardants, pigments or colorants, and other processing aids.

In general, the polymer blends can be prepared by mixing and heating the polymer resins and other additives are heated in an internal mixer, such as a Banbury-type mixer, or an extruder to provide a homogeneous blend. The temperature and pressure of the mixing are selected to avoid foaming. Preferred mixing conditions are at pressures between 20 and 200 psi and temperatures between 150 and 280° F. using an internal mixer. Alternatively, when an extruder is used to mix the blend, the temperature is maintained below about 275° F. and the pressure is generally between 500 and 5000 psi depending on the die (i.e., a pressure of between 2000 and 3000 psi is used to extrude a flat sheet). In general, the treatment temperature is selected to avoid substantial decomposition of the foaming agent and the cross-linking agent, if present. The polymer blend can be pre-formed for pressing, for example, as a sheet, by roll milling or extrusion. Alternatively, the blend can be pelletized.

The material can be extruded as a foam. The foam can take virtually any physical configuration, preferably the form of a sheet, plank, or other regular or irregular extruded profile. Foam sheets for the core material are extruded from circular dies and have thicknesses between about ⅛ and ⅜ inch and widths up to 82 inch. Core materials of smaller size, depending on requirements of the application, can be die cut from the sheets. The foam layers generally are extruded in the form of a sheet having a thickness between about 10 mils (¹⁄₁₀₀ inch) and ½ inch. The sheet of foam for the foam layers can be slit, die cut, or further laminated.

Alternatively, the polymer blend can be foam by compression molding or foamed as a sheet. In particular, the polymer blends foamed by compression molding in a first pressing operation using a high tonnage hydraulic press at a temperature between 275 and 320° F. and a pressure of between 250 and 2500 psi for between 20 and 90 minutes. The foam can be further expanded in a subsequent heating stage in an oven at a temperature between 300 and 380° F. for between 20 and 320 minutes or a second pressing operation in a medium tonnage hydraulic press at a temperature between 300 and 380° F. and a pressure of between 250 and 1500 psi for between 20 and 320 minutes. It has been observed that pre-forming step helps degas the blend, the first pressing operation helps decrease the cell size and improve cell quality, and the second pressing operation helps prevent surface degradation and loss of material. These foams generally have average densities of between 1.5 and 59 pcf.

The following specific examples are to be construed as merely illustrative, and not limitive, of the remainder of the disclosure.

EXAMPLE 1

A packaging board for suitable for protecting automotive parts was fabricated as follows:

A core material was a lightly cross-linked polyethylene foam of 14 pound per cubic foot density produced with a physical foaming agent. The 14 pcf foam was produced by extrusion of a melt which was a polymer resin blend mixed with 1 weight percent isobutane as a foaming agent, 0.2 weight percent talc as a nucleator, 1 weight percent glycerol monostearate as a cell-structure stabilizer, and 0.5 weight percent dibutyl tin dilaurate as a silanol condensation catalyst. The polymer resin blend was a mixture of 88 weight percent of a low density polyethylene having a density of 0.923 g cm$^{-3}$ and a melt index of 3.5 and 12 weight percent of low density polyethylene having a melt index of 2 and a density of 0.918 g cm$^{-3}$ which was previously modified by grafting 0.5 weight percent vinyl trimethoxy silane using 0.025 weight percent dicumyl peroxide as the grafting initiator. The melt was extruded at a temperature of approximately 220° F. in order to maintain cell structure during extrusion. The foam was cooled, rolled, and treated with steam to accelerate cross-linking. The core material had a thickness of about 3/16 inch.

The foam layers were cross-linked polyolefin foam produced with EVA resin having a density of 4 pounds per cubic foot and foamed with a chemical foaming agent. Vinyl trimethoxy silane (0.5 weight percent) was grafted onto an EVA resin which has a melt index of 2.0 and a vinyl acetate content of 9 weight percent using the grafting procedure described above for the 14 pcf foam. The grafted resin was blended with 7 weight percent azodicarbonamide as a chemical foaming agent, 0.5 weight percent dibutyl tin dilaurate as a silanol condensation catalyst, and 1.0 weight percent zinc oxide to control the foaming rate. The blend was extruded into a sheet at about 275° F. and passed through a foaming oven at about 450° F. where the chemical foaming agent decomposed to foam the sheet to a final density of 4 pcf. The foam was about 1/16 inch thick. The foam layers had tight cell structure with an average cell size of approximately 0.5 mm. Surface structure was smooth with no voids or roughness.

The laminated structure was prepared by continuous heat lamination. The 4 pcf foam layer were laminated to the 14 pcf core by applying hot air at 450° F. to the surfaces of moving webs of the foams to be laminated and pressing the foam layer and core together in the nip between two rollers to yield a core with a first foam layer laminated to one surface of the core (laminated polymer structure 1). The lamination procedure was repeated on the other side of the core material to yield a core with a foam layer laminated to each surface of the core (laminated polymer structure 2). The resulting foam layer and core of the laminated polymer structure were bonded together sufficiently so that the material failed instead of peeling.

EXAMPLE 2

A second packaging board for suitable for protecting automotive parts was fabricated in a similar manner to Example 1. In this example, the core material was a non-cross-linked polyethylene foam having a density of 17 pounds per cubic foot produced with a physical foaming agent. The core material was produced in the same process as the 14 pcf foam of Example 1, except that the silane-grafted resin was replaced with a non-grafted polyethylene resin having a density of 0.923 g cm$^{-3}$ and a melt index of 3.0.

The foam layers were 1 pcf non-cross-linked polyethylene foams produced with a physical foaming agent. The foam layers were produced using the process for the 17 pcf non-cross-linked foam of the core material where 12 weight percent of the isobutane foaming agent was used to produce the low density foam and the polymer resin was a low density polyethylene with a density of 0.918 g cm$^{-3}$ and a melt index of 2.0.

Lamination was carried out as described in Example 1.

The properties of the foams used in Examples 1 and 2 are summarized in Table 1.

TABLE 1

FOAM PROPERTIES

| Foam | Density (pcf) | Tensile @break (psi) | Elongation @break (%) | Compression deflection (at 25%) (psi) |
|---|---|---|---|---|
| 14 pcf (Ex. 1) | 14 | 370 | 15 | 71 |
| 4 pcf (Ex. 1) | 4 | 125 | 470 | 5.8 |
| 17 pcf (Ex. 2) | 17 | 460 | 15 | 91 |
| 1 pcf (Ex. 2) | 1.2 | 20 | 75 | 3 |

EXAMPLE 3

A dual density laminate for water sport boot applications was prepared as follows:

Polymer resins, cross-linking agents, foaming agents, activators, degradation inhibitors, and pigments were pre-weighed and mixed in a heated internal Banbury-type mixer for a sufficient time to properly disperse and blend the materials, but within process limitations so as to not pre-foam or pre-cross-linked materials. The materials were blended for approximately 25 minutes at a maximum temperature of about 250° F. at atmospheric pressure. The formulations used to produce the low density foam (6 pcf) and the high density foams (35 pcf) are listed in Table 2. These two foam densities are preferred for this particular boot application. Following mixing of materials to produce a warm homogeneous material blend, the material was passed through a two roll calendar to produce a flat sheet. The sheet was cut into mold-shaped squares of 1.25 inch by 6 inch by 6 inch for the low density foam and 1.25 inch by 12 inch by 12 inch for the high density foam. The prepared squares of material were placed into a mold on a heated hydraulic press platen. The high density foam was cured and expanded under a pressure of 1100 psi for 60 minutes at 305° F. The low density foam was cured and expanded under a pressure of 900 psi for 45 minutes at 305° F. The materials were removed from the press at the conclusion of the curing/expansion cycle. The high density foam required no further heat processing and served as the core material. The low density foam required a further heat treatment in an oven for 40 minutes at 340° F. The low density foam served as the first foam layer. Following the completion of heat processing, the two resultant foams were each water chilled and air cooled to room temperature.

The high density and low density foam buns were each skived to a thickness of approximately ¼ inch for the water sport boot application. The materials were now ready for laminating and embossing. A flame was applied to one surface of the high density foam and one surface of the low density foam to be laminated. The two heated surfaces were joined together and immediately passed through the nip between two rollers. This effectively laminates the two pieces together as the joined hot surfaces are cooled under pressure passing through the nip rolls to form the laminated polymer structure having a core with a foam layer laminated to one surface of the core (laminated polymer structure 1).

The surface of the low density foam which is exposed was embossed by pre-heating it as in the laminating step. The heated surface was then passed between a chilled embossing roll having a pattern on the surface and a nip roll. Upon exiting the embossing roller, the surface is chilled. The surface has the embossed pattern imposed on the surface from the embossing roller.

The composite embossed laminate was die cut for use in the water boot application.

TABLE 2

| Foam Material (35 pcf) | | Foam Material (6 pcf) | |
|---|---|---|---|
| Component | wt % | Component | wt % |
| EVA (17% VA) | 60 | LDPE | 60 |
| EPDM | 29.1 | VLDPE | 40 |
| VLDPE | 45 | IRGANOX ™ 1010 | 0.2 |
| CELOGEN ™ AZ Blow Agent | 3 | CELOGEN ™ AZ Blow Agent | 5 |
| Zinc Oxide | 0.075 | Zinc Oxide | 0.25 |
| Irganox 1010 | 0.5 | Dicumyl peroxide | 1 |
| Paraffinic oil | 15 | pigment | 2 |
| Dicumyl peroxide | 1 | Paraffinic oil | 0.5 |
| pigment | 15 | | |
| CYASORB ™ UVI 531 | 0.5 | | |
| Mineral filler | 60 | | |

Other embodiments are within the claims.

What is claimed is:

1. A method of producing a laminated foam comprising:
   providing a core structure having a first surface and a second surface and including a foamed polyolefin having a density of between 12 and 59 pounds per cubic foot; and
   laminating a first polymer foam layer to the first surface of the core structure,
   the core material and the first polymer foam layer each including a polyethylene and
   the first polymer foam layer being characterized by:
   (a) an average foam density between about 2 and 10 pounds per cubic foot and which is less than the density of the core material; and
   (b) a compression resistance (at 25%) which is less than the compression resistance (at 25%) of the core material.

2. The method of claim 1, wherein the laminating step is heat lamination.

3. The method of claim 2, further comprising the step of laminating a web or polymer film between the core material and the first polymer foam layer.

4. The method of claim 2, further comprising the step of embossing a pattern on the first polymer foam layer.

5. The method of claim 1, further comprising the step of laminating a second polymer foam layer to the second surface of the core material,
   the second polymer foam layer being characterized by:
   (a) an average foam density between about 2 and 10 pounds per cubic foot and which is less than the density of the core material; and
   (b) a compression resistance (at 25%) which is less than the compression resistance (at 25%) of the core material.

6. The method of claim 5, wherein at least one of the laminating steps is heat lamination.

7. The method of claim 6, wherein the first polymer foam layer and the second polymer foam layer each includes a vinyl acetate copolymer.

8. The method of claim 7, wherein the core material has a density between about 12 and 30 pounds per cubic foot, the first polymer foam layer has an average foam density of between about 2 and 8 pounds per cubic foot, and the second polymer foam layer has an average foam density of between about 2 and 8 pounds per cubic foot.

9. The method of claim 8, wherein the core material, the first polymer foam layer, and the second polymer foam layer each further includes a single-site initiated polyolefin resin.

* * * * *